US012770393B2

(12) United States Patent
Jamali-Rad et al.

(10) Patent No.: US 12,770,393 B2
(45) Date of Patent: Oct. 20, 2026

(54) ARTIFICIAL INTELLIGENCE SYSTEM FOR REMOTE SENSING

(71) Applicant: SHELL USA, INC., Houston, TX (US)

(72) Inventors: Hadi Jamali-Rad, Amsterdam (NL); Sieger Tet Falkena, Amsterdam (NL); Anuj Rajeeva Singh, Amsterdam (NL); Jose Roberto Lopez Bobeda, Houston, TX (US); Damian Joseph Allen, Houston, TX (US)

(73) Assignee: SHELL USA, INC., Houston, TX (US)

( * ) Notice: Subject to any disclaimer, the term of this patent is extended or adjusted under 35 U.S.C. 154(b) by 263 days.

(21) Appl. No.: 18/425,356

(22) Filed: Jan. 29, 2024

(65) Prior Publication Data

US 2025/0245981 A1 Jul. 31, 2025

(51) Int. Cl.

*G06V 20/13* (2022.01)
*G06V 10/26* (2022.01)
*G06V 10/764* (2022.01)
*G06V 20/70* (2022.01)

(52) U.S. Cl.

CPC ............ *G06V 20/13* (2022.01); *G06V 10/273* (2022.01); *G06V 10/764* (2022.01); *G06V 20/70* (2022.01)

(58) Field of Classification Search

CPC .... G06V 10/273; G06V 10/764; G06V 20/13; G06V 20/70
USPC .......................................................... 382/103
See application file for complete search history.

(56) References Cited

U.S. PATENT DOCUMENTS

2018/0039885 A1 * 2/2018 Albrecht ............ G01N 21/3504

FOREIGN PATENT DOCUMENTS

CN 109583425 B 5/2023
KR 20230171135 A * 12/2023 ............ G06Q 50/16

OTHER PUBLICATIONS

C. Robinson, B. Chugg, B. Anderson, J. M. L. Ferres and D. E. Ho, "Mapping Industrial Poultry Operations at Scale With Deep Learning and Aerial Imagery," in IEEE Journal of Selected Topics in Applied Earth Observations and Remote Sensing, vol. 15, pp. 7458-7471, 2022, doi: 10.1109/JSTARS.2022.3191544. (Year: 2022).*

(Continued)

*Primary Examiner* — Jennifer Mehmood
*Assistant Examiner* — Eric James Shoemaker
(74) *Attorney, Agent, or Firm* — SHELL USA, INC.

(57) ABSTRACT

A computing system receives remote sensing data for a geographical area. The computing system converts the remote sensing data into a format processable by downstream machine learning models. An object detection model of the downstream machine learning models detects a concentrated animal feeding operation in the remote sensing images. The computing system segments and classifies components in or around the concentrated animal feeding operation using a semantic segmentation model of the downstream machine learning models. The computing system updates outputs of the downstream machine learning models. The outputs include objects detected by the object detection model and the components segmented and classified using the semantic segmentation model. The computing system estimates a potential amount of energy yielded from the geographical area based on the concentrated animal feeding operation and the components on or around the concentrated animal feeding operation.

20 Claims, 13 Drawing Sheets

(56) References Cited

OTHER PUBLICATIONS

Environmental Law and Policy Center. Maumee Watershed Manure Impact Factsheet 1: Using Satellite Imagery to Count Animal Feeding Operations. https://elpc.org/wp-content/uploads/2020/05/CAFOFactsheet_ELPC_DRAFTv5.pdf (Year: 2020).*
Xu, S.; Xiao, W.; Yu, C.; Chen, H.; Tan, Y. Mapping Cropland Abandonment in Mountainous Areas in China Using the Google Earth Engine Platform. Remote Sens. 2023, 15, 1145. https://doi.org/10.3390/rs15041145 (Year: 2023).*
Handan-Nader, C., Ho, D.E. Deep learning to map concentrated animal feeding operations. Nat Sustain 2, 298-306 (2019). https://doi.org/10.1038/s41893-019-0246-x (Year: 2019).*
Lorrayne Miralha, Suraya Sidique, Rebecca Logsdon Muenich. The spatial organization of CAFOs and its relationship to water quality in the United States. Journal of Hydrology. vol. 613. https://www.sciencedirect.com/science/article/pii/S0022169422008733 (Year: 2022).*
Zhu et al. Meter-ML: A Multi-Sensor Earth Observation Benchmark for Automated Methane Source Mapping. https://doi.org/10.48550/arXiv.2207.11166 (Year: 2022).*
Chugg et al. Detecting Environmental Violations with Satellite Imagery in Near Real Time: Land Application under the Clean Water Act. CIKM '22: Proceedings of the 31st ACM International Conference on Information & Knowledge Management. pp. 3052-3062. https://doi.org/10.1145/3511808.3557104 (Year: 2022).*
Li et al., "Automated Detection of Poultry Farms From Aerial Images for Actionable AI System Toward Biosecurity Applications", IEEE, 2023, 4 Pages.
Tawfik et al., "Bioenergy Production From Chicken Manure: a Review", Environmental Chemistry Letters, 2023, vol. No. 21, pp. 2707-2727.
International Search Report and Written Opinion Received for PCT Patent Application No. PCT/EP2025/051383, Mailed on Mar. 25, 2025, 10 Pages.

* cited by examiner

400

500

510

520

530

ARTIFICIAL INTELLIGENCE SYSTEM FOR REMOTE SENSING

TECHNICAL FIELD

Embodiments disclosed herein generally relate to systems and methods for utilizing artificial intelligence techniques for remote sensing.

BACKGROUND

Concentrated animal feed operations (CAFOs) are significant to renewable gas production due to the large amounts of manure they produce. The methane captured from CAFOs may be used, for example, to generate electricity and heat. In some circumstances, the methane captured from CAFOs can also be use purified to natural gas and injected into gas grids. By capturing and using methane from manure, emissions that would otherwise contribute to climate change may be recycled into natural gas. In this manner, the manure in CAFOs can be converted into energy.

SUMMARY

In some embodiments, a method of identifying concentrated animal feeding operations from remote sensing data is disclosed herein. A computing system receives remote sensing data for a geographical area. The remote sensing data includes remote sensing images of the geographical area. The computing system converts the remote sensing data into a format processable by downstream machine learning models. An object detection model of the downstream machine learning models detects a concentrated animal feeding operation in the remote sensing images. The computing system segments and classifies components in or around the concentrated animal feeding operation using a semantic segmentation model of the downstream machine learning models. The computing system updates outputs of the downstream machine learning models. The outputs include objects detected by the object detection model and the components segmented and classified using the semantic segmentation model. The computing system estimates a potential amount of energy yielded from the geographical area based on the concentrated animal feeding operation and the components on or around the concentrated animal feeding operation.

In some embodiments, a non-transitory computer readable medium is disclosed herein. The non-transitory computer readable medium includes one or more programming instructions stored thereon, which, when executed by a processor, causes a computing system to perform operations. The operations include receiving, by the computing system, remote sensing data for a geographical area. The remote sensing data includes remote sensing images of the geographical area. The operations further include converting, by the computing system, the remote sensing data into a format processable by downstream machine learning models. The operations further include detecting, by an object detection model of the downstream machine learning models, a concentrated animal feeding operation in the remote sensing images. The operations further include segmenting and classifying, by the computing system, components of the concentrated animal feeding operation using a semantic segmentation model of the downstream machine learning models. The operations further include updating, by the computing system, outputs of the downstream machine learning models. The include objects detected by the object detection model and the components classified using the semantic segmentation model. The operations further include estimating, by the computing system, a potential amount of energy yielded from the geographical area based on the concentrated animal feeding operation and the components on or around the concentrated animal feeding operation.

In some embodiments, a system is disclosed herein. The system includes a processor and a memory. The memory has programming code stored thereon, which, when executed by the processor, causes the system to perform operations. The operations include receiving remote sensing data for a geographical area. The remote sensing data includes remote sensing images of the geographical area. The operations further include converting the remote sensing data into a format processable by downstream machine learning models. The operations further include detecting, by an object detection model of the downstream machine learning models, a concentrated animal feeding operation in the remote sensing images. The operations further include segmenting and classifying components of the concentrated animal feeding operation using a semantic segmentation model of the downstream machine learning models. The operations further include updating outputs of the downstream machine learning models. The outputs include objects detected by the object detection model and the components classified using the semantic segmentation model. The operations further include estimating a potential amount of energy yielded from the geographical area based on the concentrated animal feeding operation and the components on or around the concentrated animal feeding operation.

BRIEF DESCRIPTION OF THE FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
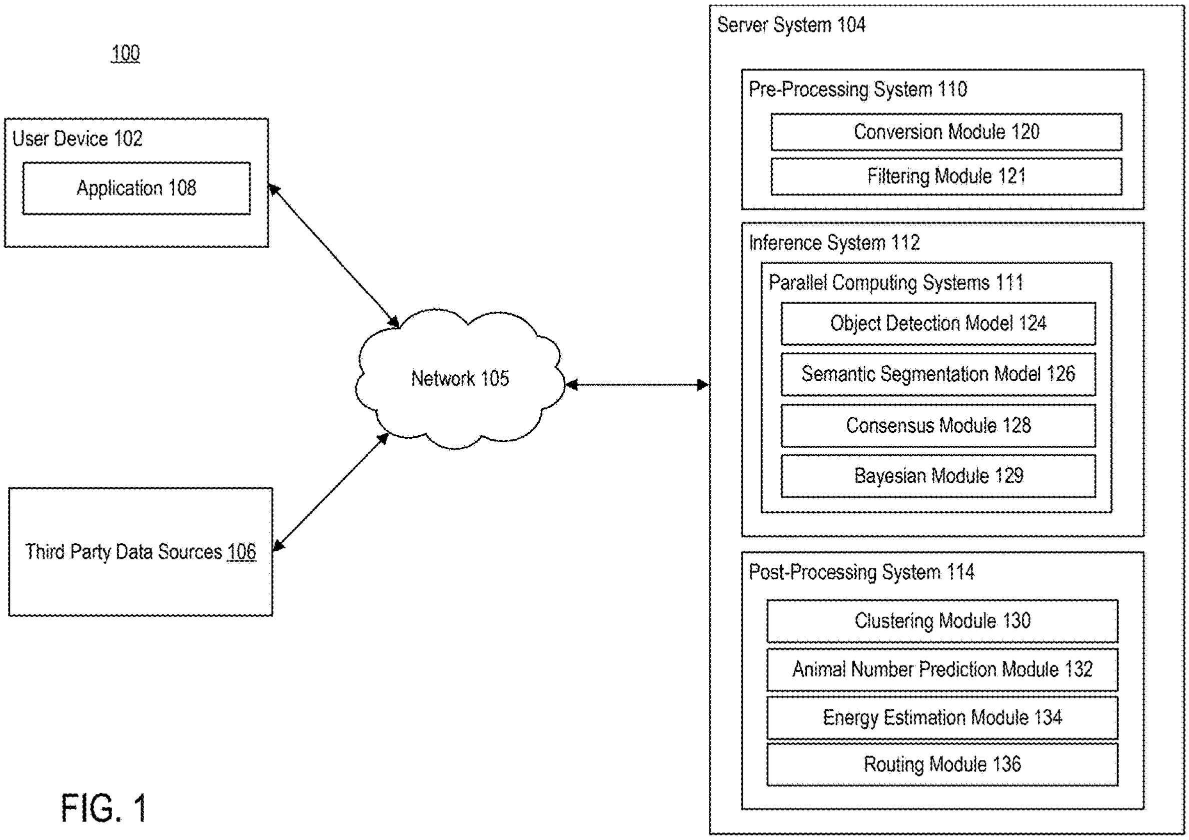
FIG. 1 is a block diagram illustrating a computing environment, according to example embodiments of the present disclosure.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

One or more techniques disclosed herein generally relate to an end-to-end solution for applying advanced artificial intelligence techniques on large-scale multi-spectral satellite and airborne imagery to extract actionable business insights for broader scope of renewable natural gas and biotechnology. Such approach may allow entities to autonomously identify renewable gas prospect hog and dairy farms and extract various insights from the farms (e.g., lagoon size, building area, built area, etc.), devise a supply chain for transportation of bio feedstock, such as manure and agricultural residues, to bio-reactor facilities for conversion and purification to biomethane and injection to natural gas pipelines for consumer applications, and identify optimal or near optimal locations to build the next bioreactors to minimize feedstock and gas transport distances.

FIG. 1 is a block diagram illustrating a computing environment 100, according to example embodiments. As shown, computing environment 100 may include a user device 102, a server system 104, and one or more third party system 106 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receive information between the components of computing environment 100.

User device 102 may be operated by a user. In some embodiments, user device 102 may represent devices of users that are associated with or subscribed to services offered by an entity associated with server system 104. In some embodiments, user device 102 may be representative of one or more computing devices, such as, but not limited to, a mobile device, a tablet, a personal computer, a laptop, a desktop computer, or, more generally, any computing device or system having the capabilities described herein.

User device 102 may include application 108. Application 108 may be representative of a web browser that allows access to a website or a stand-alone application. User device 102 may access application 108 to access one or more functionalities of server system 104. User device 102 may communicate over network 105 to request a webpage, for example, from web client application server of server system 104. In some embodiments, a user of user device 102 may execute application 108 for accessing functionality of the trained machine learning models.

Server system 104 may be configured to autonomously detect and segment concentrated animal feeding operations (CAFOs) from remote sensing data, such as open-source satellite system data, such that unregistered CAFOs and unregistered lagoons in CAFOs can be detected. Based on this information, in some embodiments, server system 104 may generate various actionable insights. For example, server system 104 may generate an estimated potential amount of energy from an unregistered lagoon through a segmentation process.

Server system 104 may include one or more subsystems. As shown, server system 104 may include pre-processing system 110, inference system 112, and post-processing system 114. Each of pre-processing system 110, inference system 112, and post-processing system 114 may be comprised of one or more software modules. The one or more software modules may be collections of code or instructions stored on a media (e.g., memory of server system 104) that represent a series of machine instructions (e.g., program code) that implements one or more algorithmic steps. Such machine instructions may be the actual computer code the processor of server system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Pre-processing system 110 may be configured to pre-process images for upload to inference system 112. In some embodiments, pre-processing system 110 may interface with one or more third party systems 106 to obtain remote sensor data for analysis. In some embodiments, one or more third party systems 106 may be representative of open-source satellite data systems such as the Microsoft Planetary Computer.

As those skilled in the art recognize, remote sensing data is generally large in size and redundant. As such, pre-processing system 110 may be configured to perform a custom-designed data handling and processing approach in order to transform the remote sensing data into a more usable format for inference. For example, in the context of classical deep learning and computer vision approaches, such techniques are typically applied to flat pixel-based images. Typically, when working with remote sensing data, such as open-source satellite data systems, the data is obtained represents the curved surface of the Earth. Classical deep learning and computer vision approaches are unable to account for this curvature. Accordingly, pre-processing system 110 may be configured to transform the raw open-source satellite data to a flat representation of the data.

In some embodiments, the data needed for inference should be up to date and have sub-meter resolution. For example, the National Agriculture Imagery Program (NAIP)

provides imagery for the whole United States at 0.6 m resolution, 0.3 m resolution, or higher. In some embodiments, the imagery may be partitioned for every county within a state. Both natural color images and color infrared imagery is typically available. In some embodiments, rasters of individual counties may be stitched together to a mosaic layer.

In some embodiments, pre-processing system 110 may include a conversion module 120. Conversion module 120 may be configured to convert the remote sensing data into a standardized format. For example, conversion module 120 may be configured to convert the remote sensing data to GeoTIFF or cloud optimized GeoTIFF (COG), which is an open-source metadata standard that allows for georeferencing information to be embedded into a TIFF file.

In some embodiments, pre-processing system 110 may further include a filtering module 121. Filtering module 121 may be configured to filter the remote sensing data to remove regions that are most likely not of interest. As those skilled in the art understand, because inference system 112 is configured to detect and classify CAFOs (e.g., dairy farms, beef feedlot facilities, and milking parlors), filtering module 121 may be permitted to filter out certain regions that are known to not include such areas of interest. Example regions that may be filtered out include, but are not limited to, military zones, urban areas above a predefined population threshold, known forest regions, altitudes above a predefined altitude threshold, and the like.

In some embodiments, inference system 112 may be deployed across a parallel computing systems 111. Inference system 112 may be configured to detect and classify areas of interest, such as CAFOs. As shown, inference system 112 may include object detection model 124, semantic segmentation model 126, consensus module 128, and Bayesian module 129.

Object detection model 124 may be trained to analyze remote sensing images and detect CAFOs. For example, object detection model 124 may be trained to detect CAFOs, which may include, but are not limited to, one or more of dairy farms, beef feedlot facilities, or milking parlors. In operations, object detection model 124 may be configured to draw or generate bounding boxes around the CAFO. In some embodiments, object detection model 124 may be representative of a convolutional neural network, such as, but not limited to, the RetinaNet-V2 model.

Semantic segmentation model 126 may be configured to classify components within or around the detected CAFOs. For example, semantic segmentation model 126 may be trained to identify and classify components, which may include one or more of an uncovered lagoon, a covered lagoon, a production pen, a milking parlor and the like. In some embodiments, semantic segmentation model 126 may be representative a convolutional neural network with an encoder-decoder architecture, such as, but not limited to the DeepLab-V3 model.

Consensus module 128 may be configured to clean or filter the raw predictions generated by object detection model 124 and/or semantic segmentation model 126. In some embodiments, consensus module 128 may be configured to filter small predictions. In some embodiments, consensus module 128 may be configured to remove object detection boxes below confidence threshold. In some embodiments, consensus module 128 may be configured to fill segmentation holes. In some embodiments, consensus module 128 may be configured to merge overlapping segmentations and/or overlapping bounding boxes. In some embodiments, consensus module 128 may be configured to generate a geospatial version of non-maximum suppression. In some embodiments, consensus module 128 may be configured to remove bounding boxes without segmentations. In some embodiments, consensus module 128 may be configured to remove bounding boxes without milking parlours. In some embodiments, consensus module 128 may be configured to extend the bounding box to the semantic segmentation (in a particular range). In some embodiments, consensus module 128 may be configured to extend the bounding box to the milking parlour. In some embodiments, consensus module 128 may be configured to remove semantic segmentations not covered by a bounding box.

More generally, in some embodiments, the role of consensus module 128 may be to perform post-processing operations on the raw inference predictions of object detection model 124 and semantic segmentation model 126. Quite a few of these post-processing operations may require inputs from both object detection model 124 and semantic segmentation model 126 rather than processing each separately. In some embodiments, Bayesian module 129 falls into the category of the former.

In some embodiments, in operation, using the ground truth annotations, Bayesian module 129 may first calculate the ratio (R_BP) of the total building area to the total production area for each of the annotated dairy and beeflot farms. Using these ratios, Bayesian module 129 may parameterize a Gaussian distribution for both the categories of farms. These distributions act as the likelihood distributions for both farm categories.

In some embodiments, when Bayesian module 129 receives, as input, the bounding box for a farm, its confidence score and the segmentation polygons inside the bounding box, Bayesian module 129 may calculate its ratio R_BP and then use the likelihood distribution to generate a probability score for the prediction. This likelihood probability and the model's original confidence score (treated as the prior) may be used by Bayesian module 129 to update the prior confidence score of the model into a posterior confidence score in light of the additional likelihood information. Specifically, the update may be carried out using the Bayesian law/theorem.

If the updated confidence for the prediction is lesser than 50%, consensus module 128 may update the category of the prediction to the other category.

Post-processing system 114 may be configured to perform one or more post-processing operations on the output from inference system 112. As shown, post-processing system 114 may include clustering module 130, animal number prediction module 132, energy estimation module 134, and routing module 136.

Clustering module 130 may be configured to cluster one or more CAFOs detected by object detection model 124. For example, clustering module 130 may be configured to cluster one or more dairy farms detected by object detection model 124 in a geographical area. In some embodiments, clustering module 130 may be utilized in providing actionable insights to end users. In some embodiments, clustering module 130 may cluster one or more dairy farms based on distance (e.g., agglomerative clustering) or by rank. More generally, an end user may toggle or update settings for clustering module 130, such as that discussed below in conjunction with FIG. 8.

Animal number prediction module 132 may be configured to predict a number of animals in a CAFO. In some embodiments animal number prediction module 132 may utilize a machine learning model (e.g., XGBoost algorithm) to predict the number of animals based on one or more of the features of milking parlor area, production pen area, facility area, or lagoon area present in or around the CAFO, as detected by semantic segmentation model 126. For example, animal number prediction module 132 may be trained on ground truth animal count information for a plurality of CAFOs distributed all across a given region (e.g., California). For each of these CAFOs, animal number prediction module 132 may also have segmentation annotations of milking parlour buildings, production pens, lagoons and detection box annotations of the farm. Using the annotations, animal number prediction module 132 may calculate the areas of each of these artefacts. These calculated areas for each farm may act as features to predict the target variable-animal count of the farm. The predicted animal count may be used to calculate the total potential energy for a CAFO or region.

Energy estimation module 134 may be configured to estimate the potential amount of energy that could be generated from a CAFO or cluster of CAFOs. For example, energy estimation module 134 may utilize the animal number prediction for estimating the potential amount energy that could be generated from a CAFO or cluster of CAFOs. For example, for each cluster formed, energy estimation module 134 may generate the total animal number in the cluster and the cluster's estimated potential amount of energy. In some embodiments, in addition to the energy that can be received from the manure, energy estimation module 134 may aggregate the energy for certain crop types that are goring in a buffer around the cluster or dairy farm.

In some embodiments, to estimate the potential amount of energy that could be generated from crops in the vicinity of a CAFO or a cluster of CAFOs, energy estimation module 134 may identify a geometry of a cluster. Energy estimation module 134 may buffer the identified geometry with a radius. Energy estimation module 134 may use the buffered geometry to clip a part of a USDA Cropland Data Layer (CDL). The CDL layer has a different pixel value for every type of crop. All those pixels intersecting with the buffered geometry may be aggregated to generate the number of crops around the cluster. Energy estimation module 134 may then use a conversion formula to generate an estimation on the possible amount of crop residue that can be used as potential energy.

Routing module 136 may be configured to optimally assign CAFO clusters to conversion facilities in order to optimize for the minimum total distance between cluster-facility pairs. For example, as those skilled in the art understand, the feedstock from lagoons has to be transported to conversion centers where methane will be extracted and purified. Transportation from farms or clusters involves costs. Accordingly, by optimally assigning CAFO clusters to conversion facilities, routing module 136, in essence, may optimize the routes between clusters of CAFOs based on the output from inference system 112. In some embodiments, routing module 136 may optimally assign CAFO clusters to conversion facilities subject to the constraints that a total mass of feedstock transported to CAFOs should be less than their capacity and that each CAFO cluster can only be assigned to one facility. Routing module 136 may specifically solve a mixed integer programming (MIP) problem and may be optimized using GLPK_MI solver in CVXPY.

Figure 2:
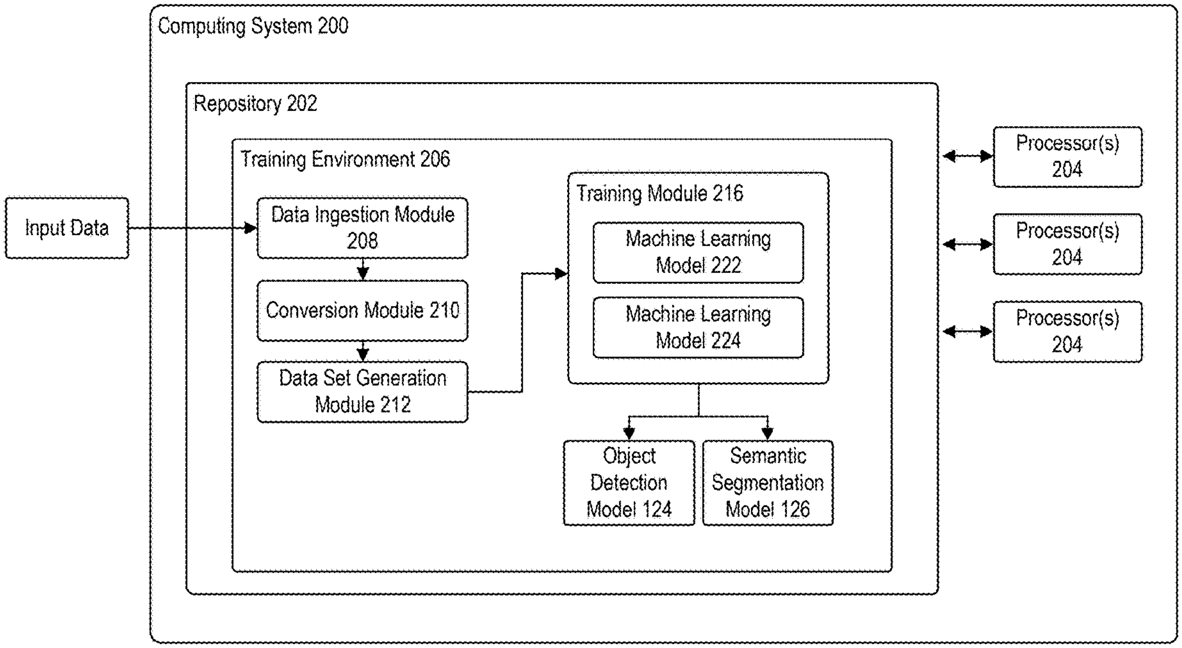
FIG. 2 is a block diagram illustrating computing system, according to example embodiments.

FIG. 2 is a block diagram illustrating computing system 200, according to example embodiments. As shown, FIG. 2 may represent a training environment in which machine learning models may be trained to detect one or more CAFOs and classify components within or around the one or more CAFOs. Computing system 200 may include a repository 202 and one or more computer processors 204.

Repository 202 may be representative of any type of storage unit and/or device (e.g., a file system, database, collection of tables, or any other storage mechanism) for storing data. Further, repository 202 may include multiple different storage units and/or devices. The multiple different storage units and/or devices may or may not be of the same type or located at the same physical site. As shown, repository 202 includes at least a training environment 206. Training environment 206 may represent a computing environment in which one or more machine learning models may be trained to detect one or more CAFOs and classify components within or around the one or more CAFOs.

As shown, training environment 206 may include data ingestion module 208, conversion module 210, data set generation module 212, and training module 216. Each of data ingestion module 208, conversion module 210, data set generation module 212, and training module 216 may include one or more software modules. The one or more software modules can be collections of code or instructions stored on a media (e.g., memory of computing system 200) that represent a series of machine instructions (e.g., program code) that implements one or more algorithmic steps. Such machine instructions may be the actual computer code the processor of computing system 200 interprets to implement the instructions or, alternatively, may be a higher level of coding of the instructions that are interpreted to obtain the actual computer code. The one or more software modules may also include one or more hardware components. One or more aspects of an example algorithm may be performed by the hardware components (e.g., circuitry) itself, rather than as a result of the instructions.

Data ingestion module 208 may be configured to interface with one or more third party systems. For example, data ingestion module 208 may receive or identify open-source satellite data.

Conversion module 210 may be similar to conversion module 120. Conversion module 210 may be configured to the remote sensing data into a standardized format. For example, conversion module 120 may be configured to convert the remote sensing data to GeoTIFF or COG. In some embodiments, conversion module 210 may also be configured to normalize the imagery for both detection and segmentation tasks. For example, detection tasks may work on red, green, and infrared (RGIR) bands; segmentation tasks may work on red, green, and blue (RGB) bands. In some embodiments, such as those for semantic segmentation, conversion module 210 may apply offline augmentations for uncovered lagoon classes to restore class imbalance. For example, during such offline augmentation, conversion module 210 may apply pixel level augmentations, such as brightness/contrast and color jitter to the pixels of the lagoon only. In some embodiments, conversion module 210 may further apply spatial distortions to the whole image.

Data set generation module 212 may be configured to annotate each satellite image. In some embodiments, data set generation module 212 may be configured to annotate each satellite image by interfacing with one or more GIS software applications.

In some embodiments, data set generation module 212 may receive an annotated data set for detection tasks. For example, the satellite images may be annotated to include the classes of CAFOs for detection. Exemplary classes of CAFOs for detection may include, but are not limited to, dairy farms, beef feedlot facilities, and milking parlor. In some embodiments, the annotations for the CAFOs may take the form of a bounding box and associated label. In some embodiments, during generation of the data set for detection, a grid of chips, which may represent the metadata of the outline of the images may be generated. The chips, i.e., the metadata of the images, that overlap with ground truth data are included in the data set for detection. All chips that overlap with one or more specific conditions may then be clustered and split between training and validation. Each chip in the grid around a CAFO may act as an image in the training/testing set of the dataset used to train either object detection model 124 or semantic segmentation model 126. In some embodiments, the generated grid may be ensured to contain multiple different views of the same target artefact/object with different contextual cues in order to provide natural image augmentations of each object. Once the data set split is generated, the images may be cropped from a large mosaic of images.

For semantic segmentation, the satellite images may be annotated based on one or more of the following classes: uncovered lagoon, covered lagoon, production pen, barn, milking parlor, or other building. Although several exemplary classes are listed, those skilled in the art understand, that the semantic segmentation process is not limited to these classes and can be fully customizable to end users. For semantic segmentation, rather than use the grid-based approach discussed above for detection, tessellated chipping may be used to define the chips for the data set. During tessellated chipping, the bounding box of a CAFO is identified, and the chips are centered on the bounding box. Such process differs from objection detection because semantic segmentation only deals with regions around the CAFOs (e.g., around a dairy farm).

In some embodiments, to complete the training and test data sets, data ingestion module 208 may receive true negative images. The true negative images may be satellite images that were selected as being challenging examples for machine learning model 222 and machine learning model 224 during training.

Once the training data sets for training/testing an object detection model and a semantic segmentation model are generated, the training data sets may be provided to training module 216 for training. In some embodiments, training module 216 may train machine learning model 222 to detect CAFOs based on the training and test data sets corresponding to object detection. Once trained, training module 216 may output object detection model 124 configured to detect CAFOs, such as, but not limited to dairy farms, beef feedlot facilities, and milking parlors. Similarly, training module 216 may train machine learning model 224 to segment and classify objects within CAFOs based on the training and test data sets corresponding to semantic segmentation. Once trained, training module 216 may output semantic segmentation model 126 configured to segment and classify objects of interest, such as, but not limited to uncovered lagoon, covered lagoon, production pen, barn, milking parlor, or other building.

Accordingly, in this manner, object detection model 124 and semantic segmentation model 126 may work in conjunction to identify CAFOs and classify objects or components contained in or around the CAFOs.

Figure 3:
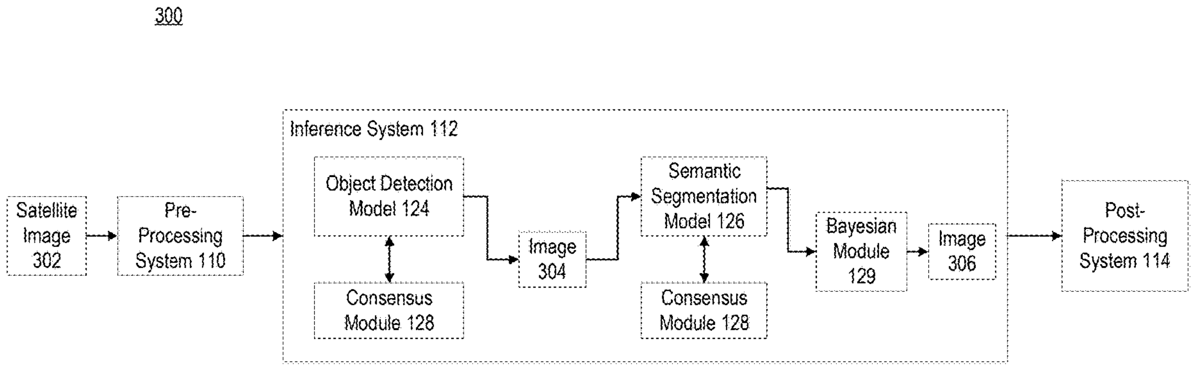
FIG. 3 is a block diagram illustrating an inference workflow, according to example embodiments.

FIG. 3 is a block diagram illustrating an inference workflow 300, according to example embodiments. As shown, inference workflow 300 may begin when a satellite image 302 is received or identified. Satellite image 302 may be provided to pre-processing system 110. Pre-processing system 110 may be configured to pre-process satellite image 302, such that it is in a form ready for inference. In some embodiments, conversion module 120 may convert satellite image 302 into a standardized format. For example, conversion module 120 may convert the remote sensing data to GeoTIFF or COG or directly into an in-memory array or tensor. In some embodiments, filtering module 121 may filter satellite image 302 to remove regions that are most likely not to include CAFOs. For example, filtering module 121 may filter out regions that include, but are not limited to, military zones, urban areas above a predefined population threshold, known forest regions, altitudes above a predefined altitude threshold, and the like. The pre-processed satellite image may then be provided to inference system 112 for inference.

As shown, the pre-processed satellite image data may be input to object detection model 124. Object detection model 124 may analyze the image to detect one or more CAFOs. For example, object detection model 124 may detect one or more of dairy farms, beef feedlot facilities, and milking parlors. In some embodiments, object detection model 124 may work in conjunction with consensus module 128 for generate a label and a confidence for each detected CAFO. For example, consensus module 128 may receive the raw bounding box prediction from object detection model 124 and its associated confidence value. In some embodiments, consensus module 128 may operate functions such as, but not limited to: filter small predictions, remove boxes below confidence threshold, and/or geospatial version of non-maximum suppression. In other words, consensus module 128 may refine the raw inference predictions from object detection model 124. Accordingly, as output, object detection model 124 and consensus module 128 may output an object detected image with its associated bounding boxes and labels (hereinafter “image 304”).

Image 304 may then be provided to semantic segmentation model 126 for analysis. Semantic segmentation model 126 may analyze image 304 to segment and/or classify objects in or around the identified one or more CAFOs. For example, assume that image 304 includes a bounding box that is labeled as a dairy farm. Semantic segmentation model 126 may analyze the region contained in or around the bounding box, or more broadly, the tessellation chipping around the bounding boxes, to segment and classify objects contained in or around the bounding box. Exemplary classifications may include uncovered lagoon, covered lagoon, production pen, barn, milking parlor, or other building. Based on the analysis of image 304 and the classification provided by semantic segmentation model 126, consensus module 128 may update one or more of the labels and the confidence level associated with each label. For example, consensus module 128 may update the semantic segmentation predictions by operating functions such as, but not limited to: filter small predictions, fill segmentation holes and merge overlapping segmentations.

In some embodiments, consensus module 128 may go back and update the detection prediction generated by object detection model 124 based on the one or more components classified by semantic segmentation model 126. Consensus module 128 may operate functions such as, but not limited to: remove bounding boxes without segmentations, remove bounding boxes without milking parlors, extend the bounding box to the semantic segmentation, extend the bounding box to the milking parlor, remove semantic segmentations not covered by a bounding box.

In some embodiments, Bayesian module 129 may then update and refine the shape and confidence score of each dairy and beef feedlot bounding box as described earlier.

Accordingly, as output, Bayesian module 129 may generate a segmented image with its associated detection bounding boxes (hereinafter "image 306"). In other words, as output from processing system 110, an image that includes an indication of a CAFO and a classification of objects within or around the CAFO is generated.

Image 306 may then be provided to post-processing system 114 for downstream analysis.

Figure 4:
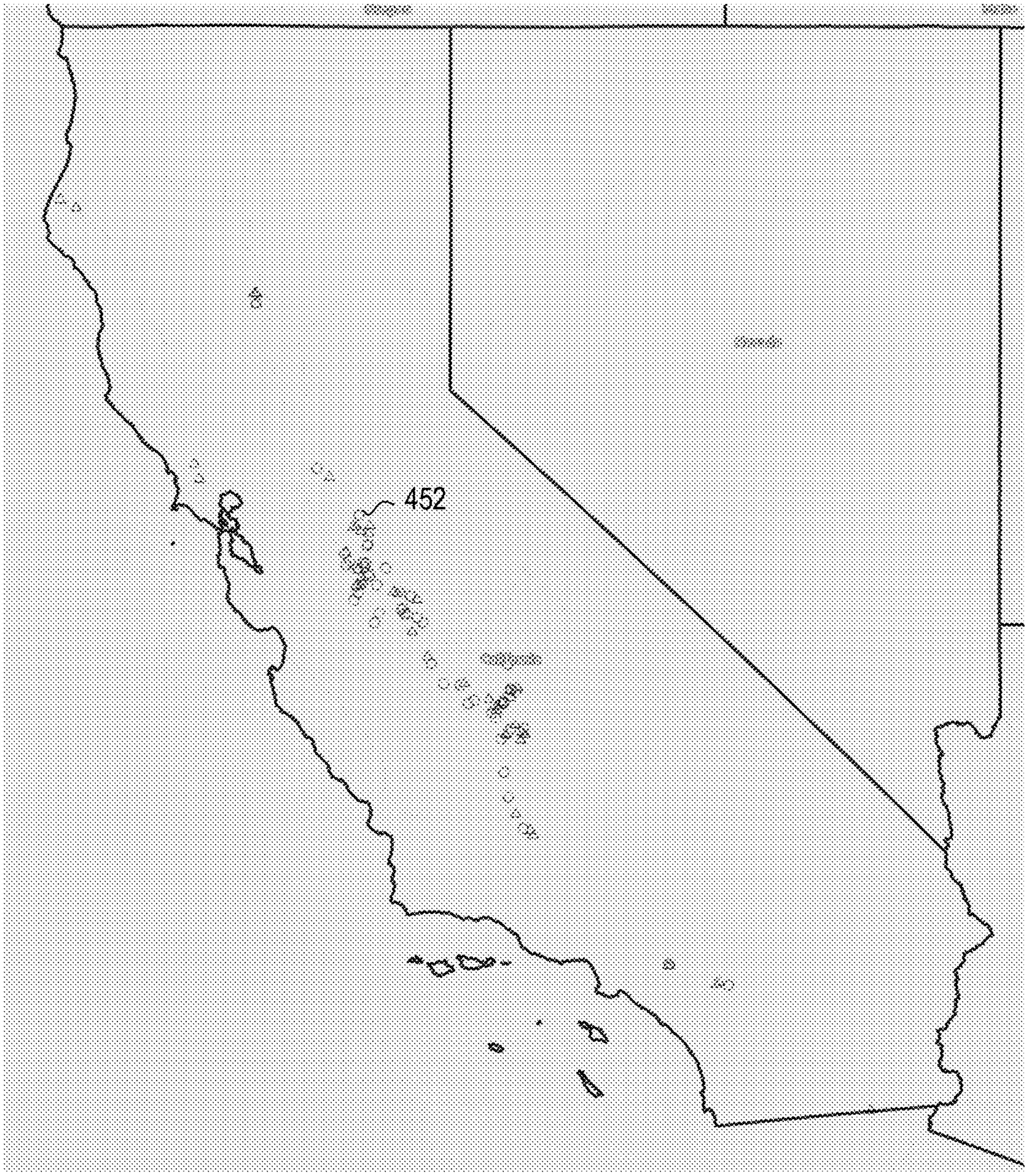
FIG. 4 is a block diagram illustrating an example area of interest showing guiding points for annotation, according to example embodiments.
Figure 5A:
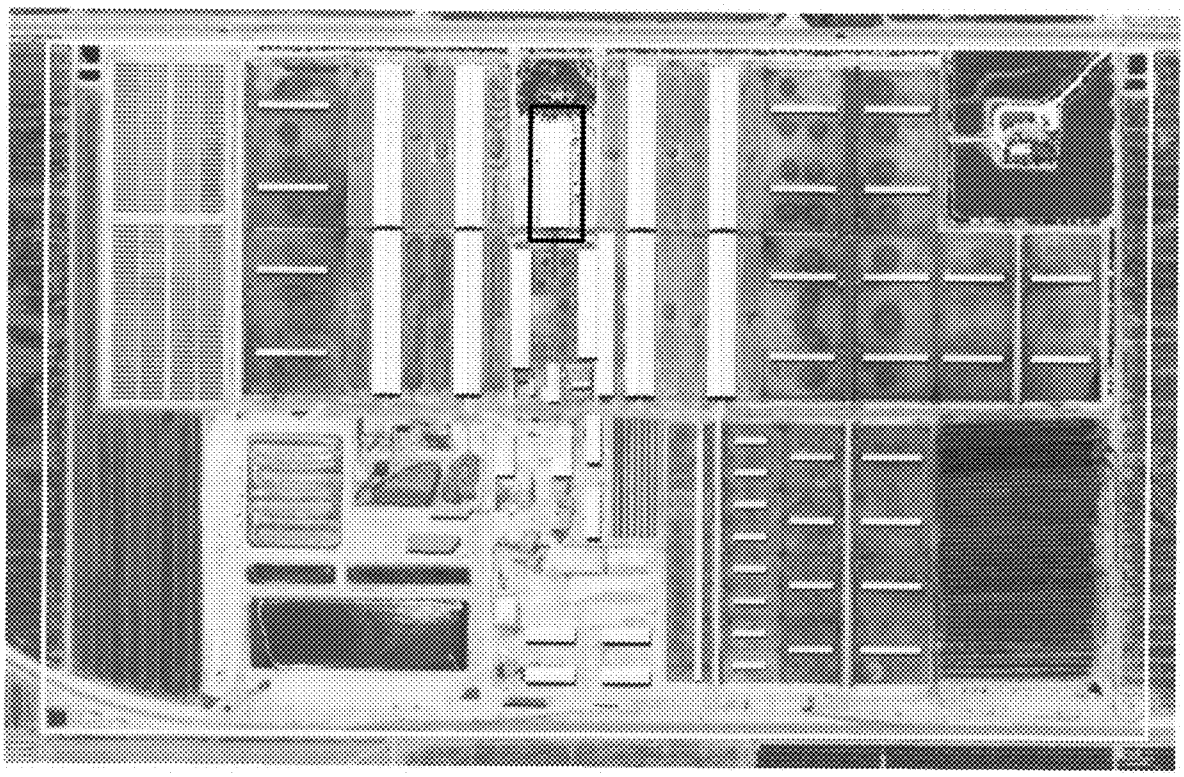
FIGS. 5A-5D illustrates example areas of interest, according to example embodiments.
Figure 5B:
Figure 5C:
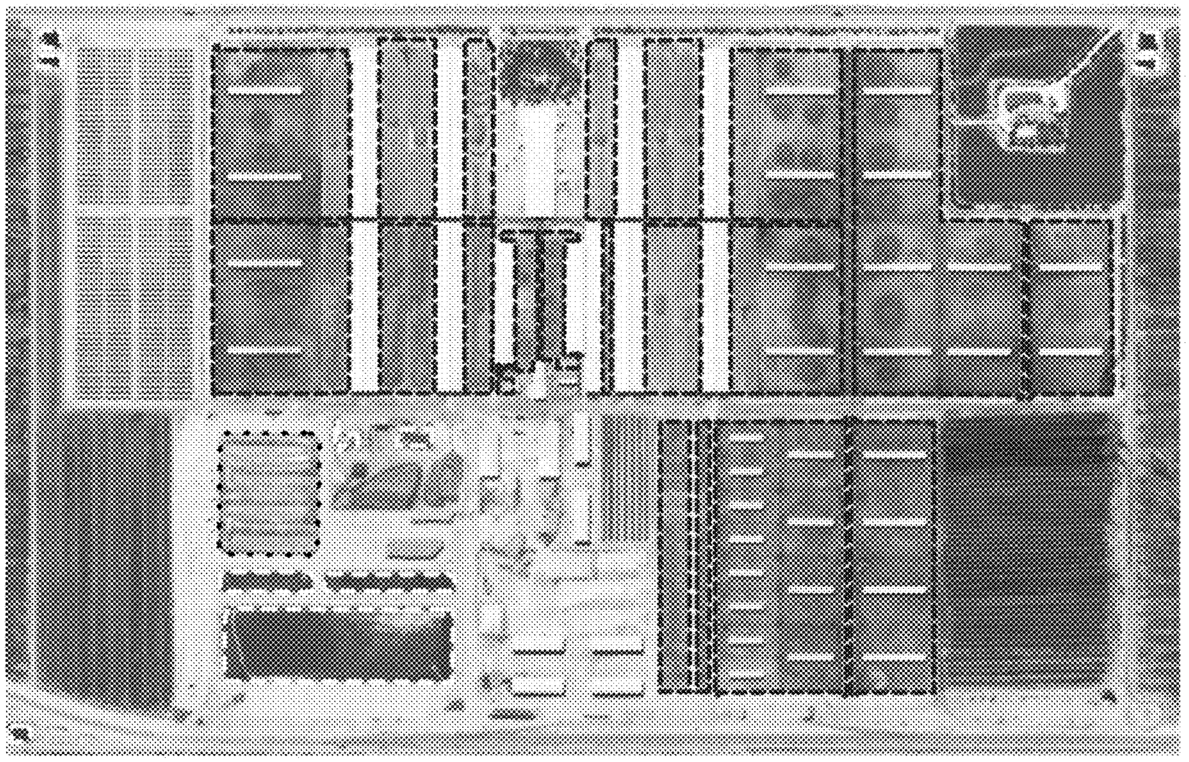
Figure 5D:
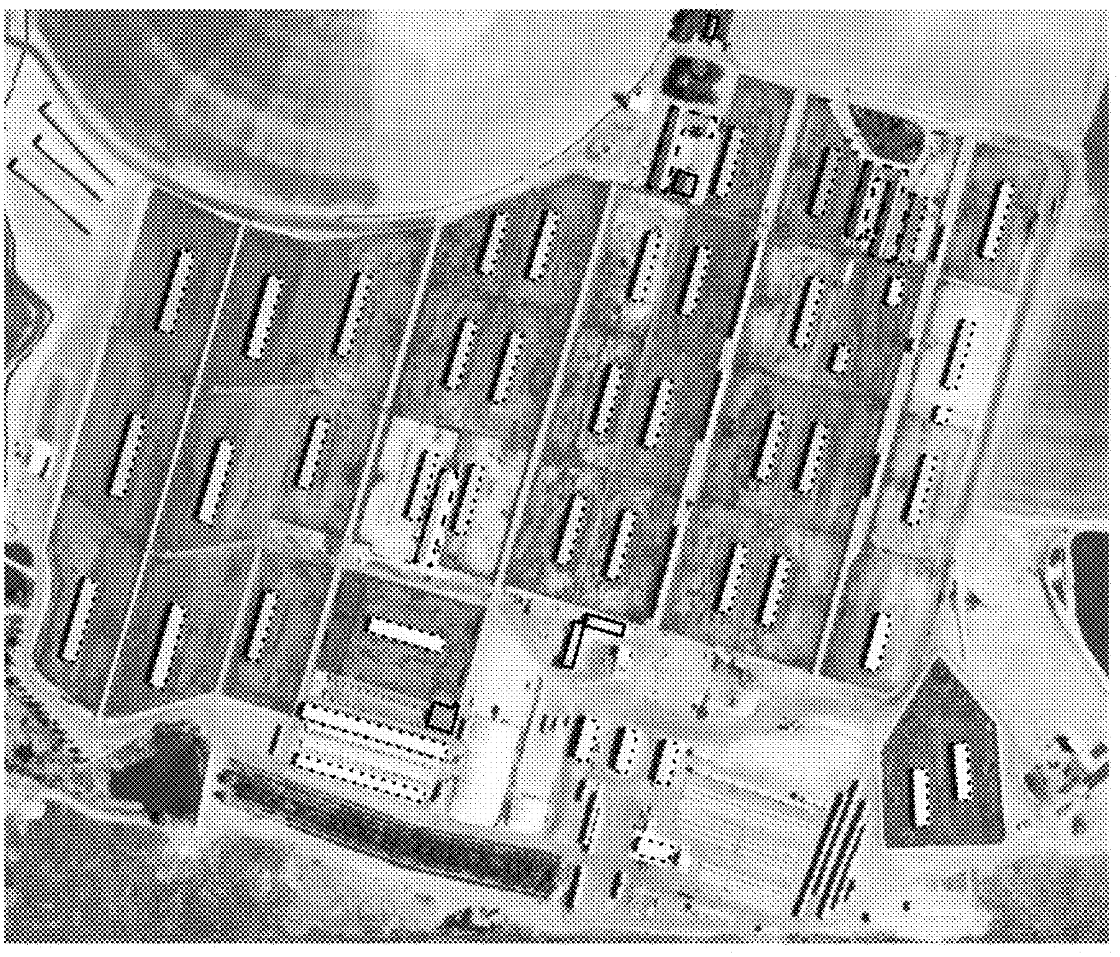

FIG. 4 is a block diagram illustrating an example area of interest 400, according to example embodiments. As shown, area of interest 400 may correspond to the state of California. In some embodiments, area of interest 400 may include a plurality of indications 452. Each of the plurality of indications 452 may indicate the presence of a CAFO. In some embodiments, plurality of indications 452 may be utilized as a guiding point during the annotation process. For example, the triangle and circle icons illustrated in FIG. 4 may refer to example groups of guiding points that may be provided to different annotators.

FIGS. 5A-5D illustrates an example area of interest 500, 510, 520, and 530, according to example embodiments. As shown, area of interest 500-530 may include a plurality of bounding boxes and semantic segmentation annotations. Each bounding box may indicate a detected component in the geographic area. For example, detected objects in FIG. 5A may include a dairy farm (bounding box having a solid white line), a milking parlour (bounding box having a solid black line), and in FIG. 5B a beeflot (bounding box having a solid black line). Semantic segmentation objects in FIG. 5C may include uncovered lagoon (polygon having white dashed lines), covered lagoons (polygon having black dots), and a production pen (polygon having black dashes). Semantic segmentation objects in FIG. 5D may include milking parlours (polygon having black dashed lines), barns (polygon having black dots) and other buildings (polygon having solid black line).

Figure 6:
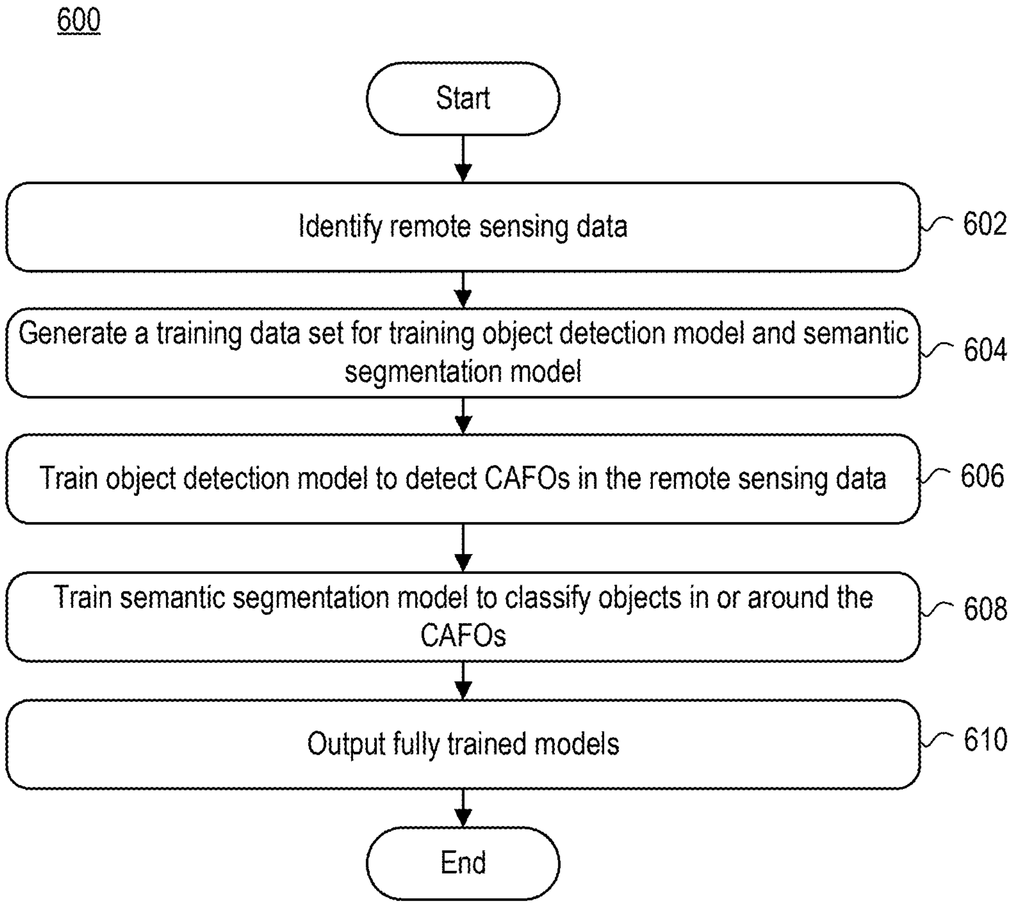
FIG. 6 is a flow diagram illustrating a method of training an object detection model and a semantic segmentation model, according to example embodiments.

FIG. 6 is a flow diagram illustrating a method 600 of training an object detection model and a semantic segmentation model, according to example embodiments. Method 600 may begin at step 602.

At step 602, computing system 200 may identify remote sensing data. In some embodiments, computing system 200 may identify remote sensing data by interfacing with one or more third party systems. For example, computing system 200 may identify or receive open-source satellite data.

At step 604, computing system 200 may generate a training data set for training machine learning model 222 and machine learning model 224. For example, computing system 200 may generate a first training set to train machine learning model 222 to detect CAFOs. Computing system 200 may also generate a second training data set for training machine learning model 224. For example, computing system 200 may generate a second training set to train a second machine learning model to segment and classify objects within or around a detected CAFO.

In some embodiments, to generate the training data set, computing system 200 may perform one or more pre-processing operations on the remote sensing data. In some embodiments, the pre-processing operations may include converting the remote sensing data into a standardized format. For example, computing system 200 may convert the remote sensing data to GeoTIFF or COG. In some embodiments, the pre-processing operations may include normalizing the imagery for both detection and segmentation tasks. In some embodiments, the pre-processing operations may include filtering the remote sensing data to remove regions that are most likely not to include a CAFO.

In some embodiments, to generate the training data set, computing system 200 may further receive annotations for the remote sensing data. For example, the annotations may include a first set of annotations for object detection training (e.g., bounding boxes around CAFOs) and a second set of annotations for semantic segmentation training (e.g., classifications of objects within or around CAFOs).

At step 606, computing system 200 may train machine learning model 222 to detect CAFOs in remote sensing data based on the training data set. For example, computing system 200 may train machine learning model 222 to detect one or more of a dairy farm, a beef feedlot, a milking parlor, and the like based on the first training data set.

At step 608, computing system 200 may train machine learning model 224 to classify objects in or around CAFOs based on the training data set. For example, computing system 200 may train machine learning model 224 to classify objects in or around the detected CAFOs into one or more classes. The one or more classes may include, but are not limited to uncovered lagoon, covered lagoon, production pen, barn, milking parlor, or other building.

At step 610, computing system 200 may output fully trained models. For example, computing system 200 may yield object detection model 124 and semantic segmentation model 126 following training. Object detection model 124 and semantic segmentation model 126 may be ready for inference.

Figure 7:
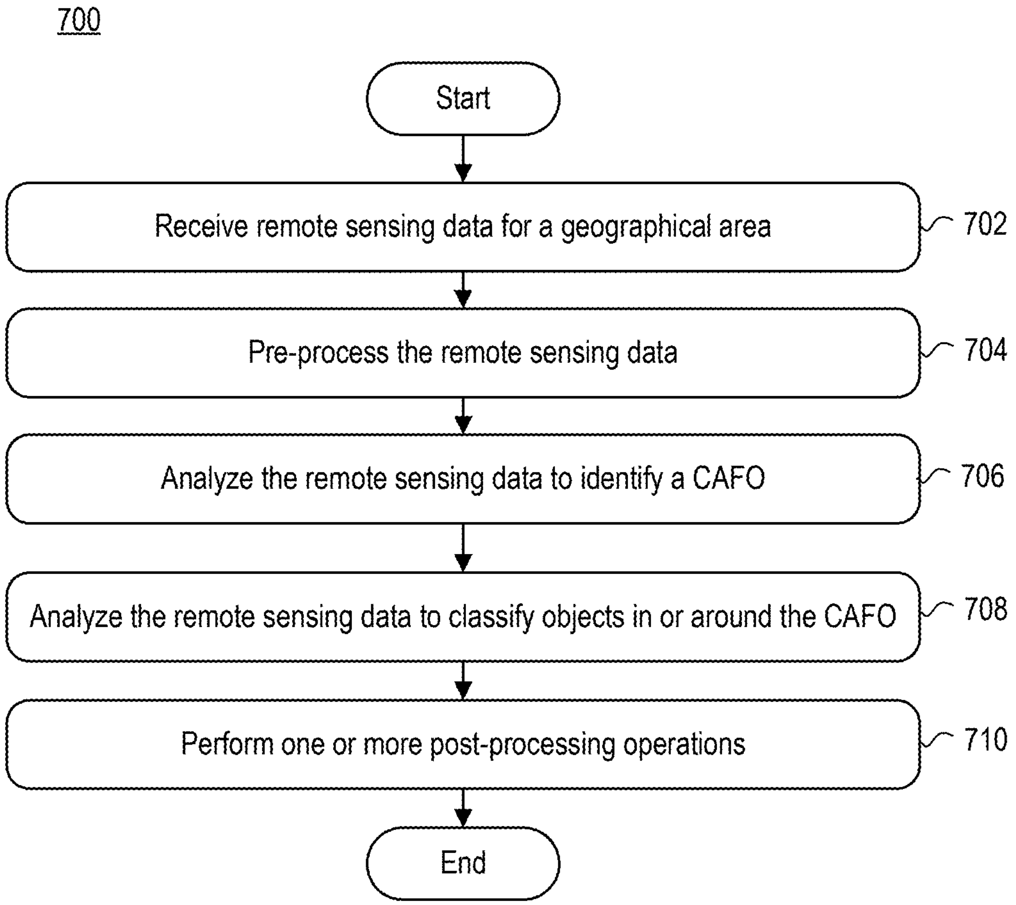
FIG. 7 is a flow diagram illustrating a method of identifying objects of interest in remote sensing data, according to example embodiments.

FIG. 7 is a flow diagram illustrating a method 700 of identifying objects of interest in remote sensing data, according to example embodiments. Method 700 may begin at step 702.

At step 702, server system 104 may receive remote sensing data for a geographical area. In some embodiments, the remote sensing data may be representative of satellite data corresponding to the geographical area.

At step 704, server system 104 may pre-process the remote sensing data. Pre-processing system 110 may pre-process the remote sensing data, such that it is in a form ready for inference. In some embodiments, pre-processing the remote sensing data may include conversion module 120 converting the remote sensing data into a standardized format. For example, conversion module 120 may convert the remote sensing data to GeoTIFF or COG. In some embodiments, pre-processing the remote sensing data may include filtering module 121 filtering the remote sensing data to remove regions that are most likely not of interest. For example, filtering module 121 may filter out regions that include, but are not limited to, military zones, urban areas above a predefined population threshold, known forest regions, altitudes above a predefined altitude threshold, and the like.

At step 706, server system 104 may analyze the remote sensing data to identify a CAFO contained therein. For example, object detection model 124 may analyze the remote sensing data to identify or detect one or more of dairy farms, beef feedlot facilities, and milking parlor. In some embodiments, object detection model 124 may work in conjunction with consensus module 128 to generate a label and a confidence for each detected CAFO.

At step 708, server system 104 may analyze the detected CAFO to classify objects in or around the CAFO. For example, semantic segmentation model 126 may analyze the region contained in or around the bounding box generated by object detection model 124, or more broadly, the tessellation chipping around the bounding box, to segment and classify objects contained in or around the bounding box. Exemplary classifications may include uncovered lagoon, covered lagoon, production pen, barn, milking parlor, or other building. Based on the analysis of the CAFO and the classification provided by semantic segmentation model 126, consensus module 128 may change or update the extent and/or existence of object detection bounding boxes or semantic segmentation polygons. Bayesian module 129 may utilize a Bayesian update step to refine the raw prediction generated by object detection model 124. For example, Bayesian module 129 may receive the raw bounding box prediction from object detection model 124 and its associated confidence value and segmentations from semantic segmentation model 126. Based on the analysis of the pre-processed satellite image and the output from object detection model 124 and semantic segmentation model 126, consensus module 128 may update one or more of the bounding box and confidence level.

At step 710, server system 104 may perform one or more post-processing operations based on the output from object detection model 124 and semantic segmentation model 126. In some embodiments, post-processing operations may include clustering one or more CAFOs detected by object detection model 124. For example, clustering module 130 may cluster one or more CAFOs detected by inference system 112 in a geographical area. In some embodiments, post-processing operations may include predicting a number of animals in CAFO based on, for example, on one or more of the milking parlor area, production pen area, facility area, or lagoon area present in or around the CAFO, as detected by semantic segmentation model 126. In some embodiments, post-processing operations may include estimating the potential amount of energy that could be generated from a CAFO. In some embodiments, post-processing operations may include optimizing routes between the identified clusters.

Figure 8:
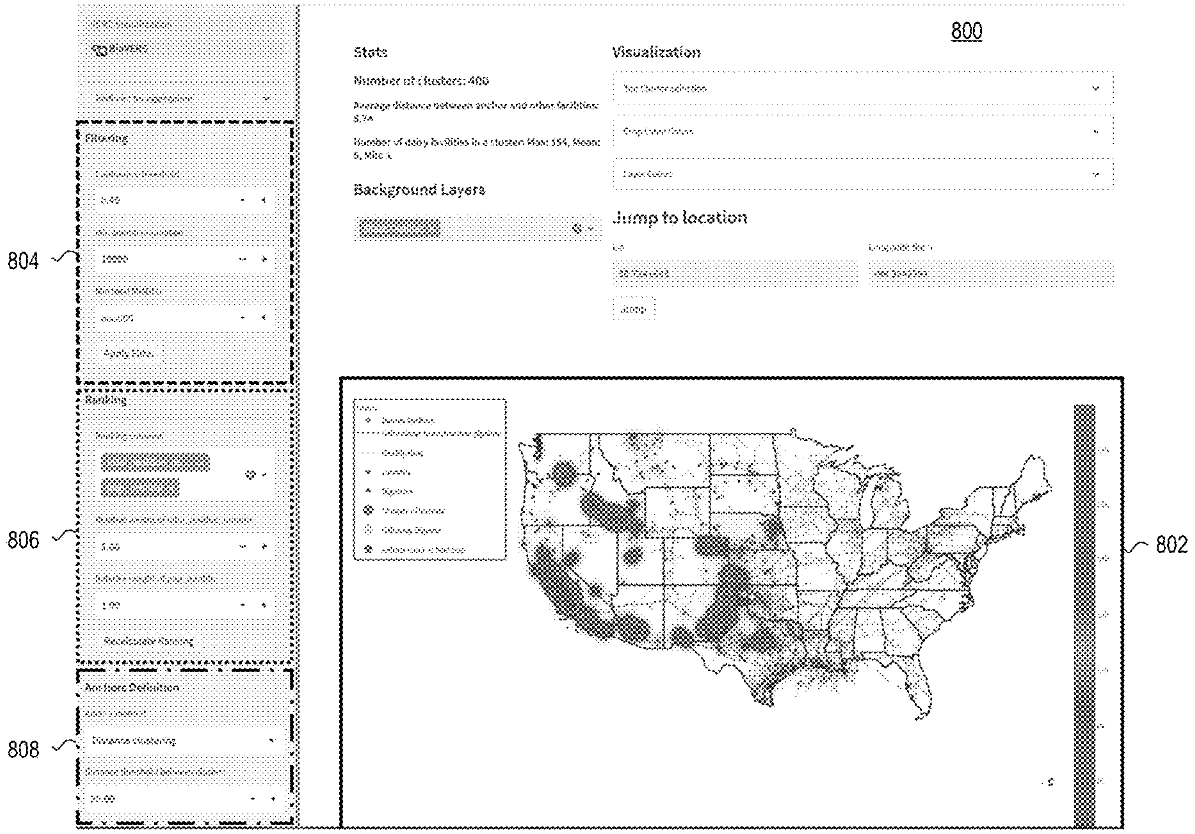
FIG. 8 is a block diagram illustrating an exemplary graphical user interface (GUI), according to example embodiments.

FIG. 8 is a block diagram illustrating an exemplary graphical user interface (GUI) 800, according to example embodiments. As shown, GUI 800 may allow a user to interact with an interactive map 802. Interactive map 802 may allow a user to identify CAFOs detected by server system 104.

In some embodiments, GUI 800 may include filtering parameters 804. Filtering parameters 804 may allow a user to define how the CAFOs are filtered on interactive map 802. In some embodiments, filtering parameters 804 may allow a user to filter CAFOs by confidence level, as determined by inference system 112. In some embodiments, filtering parameters 804 may allow a user to filter CAFOs by their minimum animal population. In some embodiments, filtering parameters 804 may allow a user to filter CAFOs by their minimum potential amount of energy generated.

In some embodiments, GUI 800 may include ranking parameters 806. Ranking parameters 806 may be used to rank the CAFOs in interactive map 802. In some embodiments, ranking parameters 806 may include a distance to the nearest pipeline, a size of a facility, and/or a confidence of facility prediction.

In some embodiments, GUI 800 may include clustering parameters 808. Clustering parameters 808 may be used to define how the identified CAFOs should be clustered. In some embodiments, clustering parameters 808 may allow the user to define the clustering method used (e.g., clustering by distance). In some embodiments, clustering parameters 808 may allow the user to define constraints of the clustering method (e.g., distance threshold between clusters).

Figure 9:
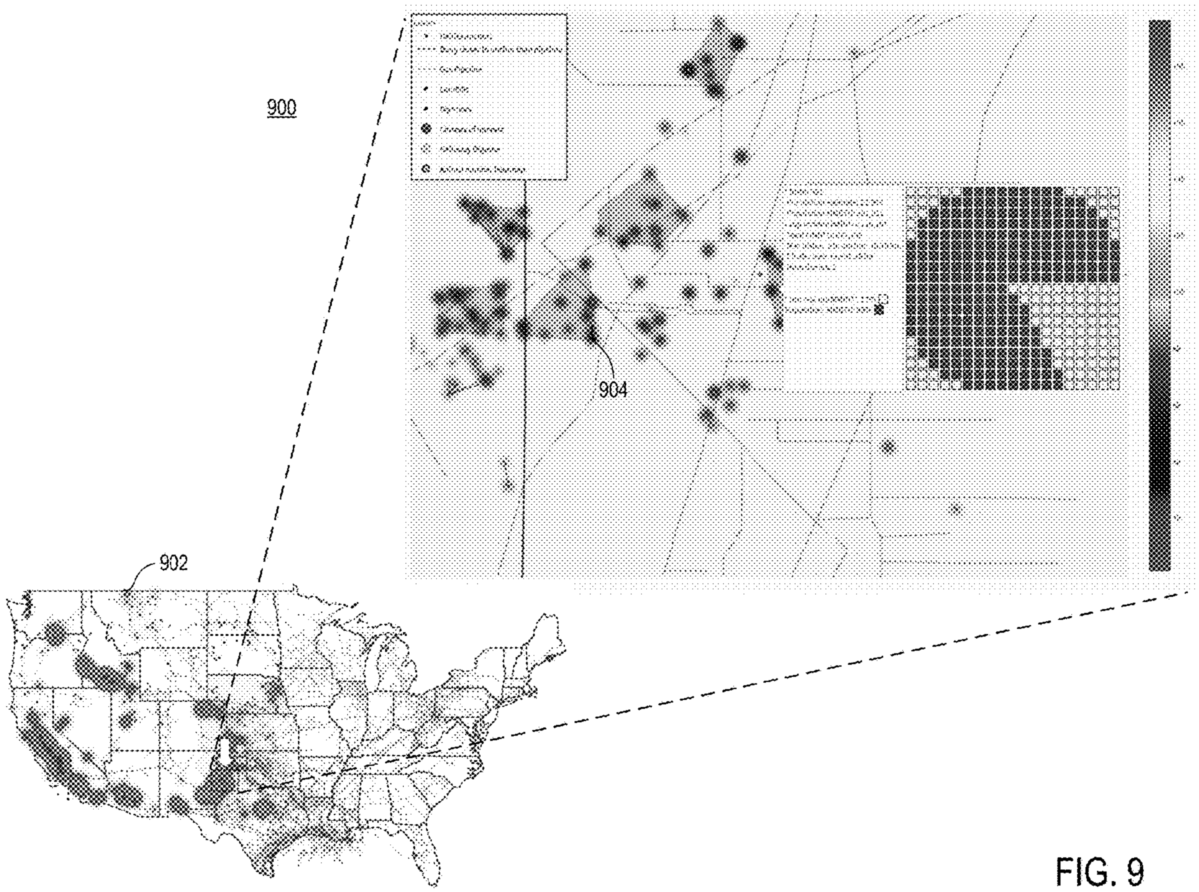
FIG. 9 is a block diagram illustrating an exemplary GUI, according to example embodiments.

FIG. 9 is a block diagram illustrating an exemplary GUI 900, according to example embodiments. As shown, GUI 900 includes a map 902 that has a plurality of clusters 904. For ease of illustrating, a portion of map 902 is enlarged. Each cluster 904 may include CAFOs, such as a dairy farm, a beef feedlot, a milking parlor, or the like. When a user hovers over a cluster or CAFO, GUI 900 may be updated to include statistics corresponding to that cluster or a CAFO. For example, GUI 900 may be updated to include an overlay window that includes statistics corresponding the that selected cluster or CAFO.

Figure 10A:
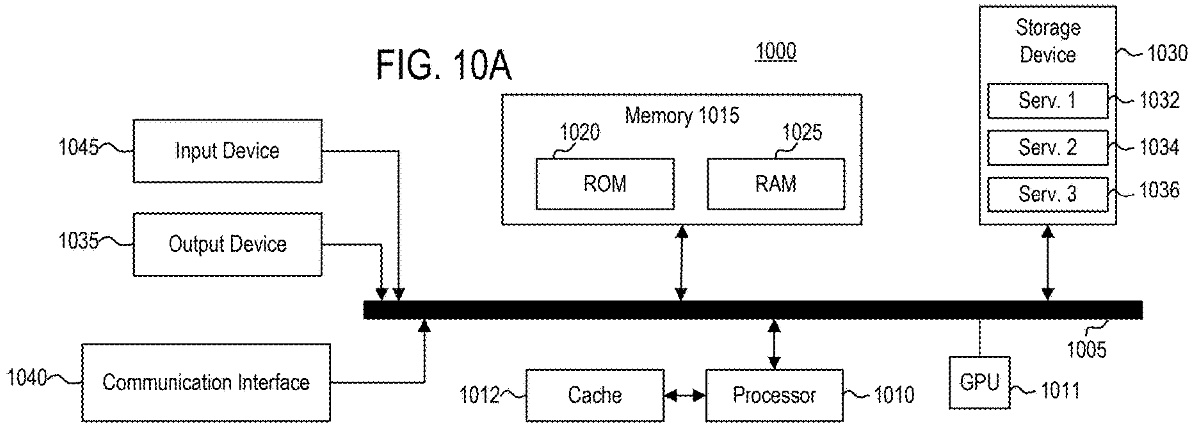
FIG. 10A is a block diagram illustrating a computing device, according to example embodiments of the present disclosure.

FIG. 10A illustrates a system bus architecture of computing system 1000, according to example embodiments. System 1000 may be representative of one or more of user device 102, server system 104, and/or computing system 200. One or more components of system 1000 may be in electrical communication with each other using a bus 1005. System 1000 may include a processing unit (CPU or processor) 1010, a graphical processing unit 1011, and a system bus 1005 that couples various system components including the system memory 1015, such as read only memory (ROM) 1020 and random-access memory (RAM) 1025, to processor 1010.

System 1000 may include a cache of high-speed memory connected directly with, in close proximity to, or integrated as part of processor 1010. System 1000 may copy data from memory 1015 and/or storage device 1030 to cache 1012 for quick access by processor 1010. In this way, cache 1012 may provide a performance boost that avoids processor 1010 delays while waiting for data. These and other modules may control or be configured to control processor 1010 to perform various actions. Other system memory 1015 may be available for use as well. Memory 1015 may include multiple different types of memory with different performance characteristics. Processor 1010 may include any general-purpose processor and a hardware module or software module, such as service 1 1032, service 2 1034, and service 3 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 may represent any number of input mechanisms, such as a microphone for speech, a touch-sensitive screen for gesture or graphical input, keyboard, mouse, motion input, speech and so forth. An output device 1035 may also be one or more of a number of output mechanisms known to those of skill in the art. In some instances, multimodal systems may enable a user to provide multiple types of input to communicate with computing system 1000. Communications interface 1040 may generally govern and manage the user input and system output. There is no restriction on operating on any particular hardware arrangement and therefore the basic features here may easily be substituted for improved hardware or firmware arrangements as they are developed.

Storage device 1030 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1025, read only memory (ROM) 1020, and hybrids thereof.

Storage device 1030 may include services 1032, 1034, and 1036 for controlling the processor 1010. Other hardware or software modules are contemplated. Storage device 1030 may be connected to system bus 1005. In one aspect, a hardware module that performs a particular function may include the software component stored in a computer-readable medium in connection with the necessary hardware components, such as processor 1010, bus 1005, output device 1035 (e.g., display), and so forth, to carry out the function.

Figure 10B:
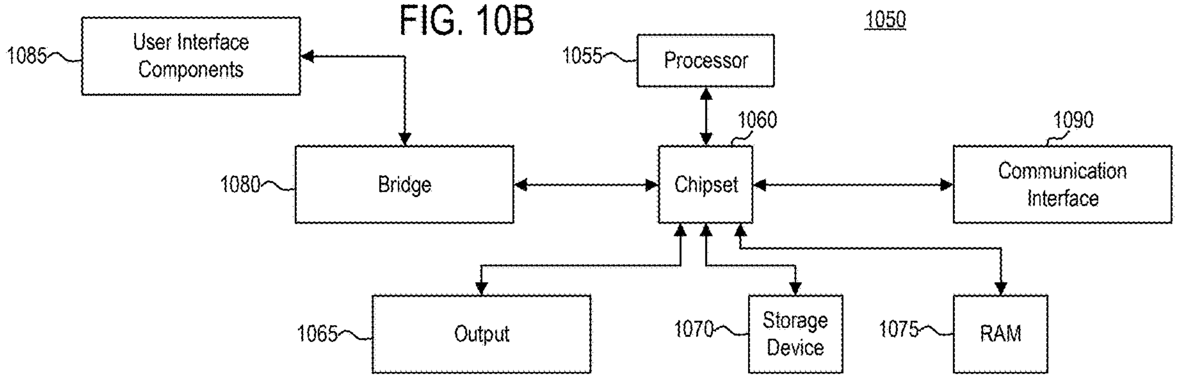
FIG. 10B is a block diagram illustrating a computing device, according to example embodiments of the present disclosure.

FIG. 10B illustrates a computer system 1050 having a chipset architecture that may represent user device 102. Computer system 1050 may be an example of computer hardware, software, and firmware that may be used to implement the disclosed technology. System 1050 may include a processor 1055, representative of any number of physically and/or logically distinct resources capable of executing software, firmware, and hardware configured to perform identified computations. Processor 1055 may communicate with a chipset 1060 that may control input to and output from processor 1055.

In this example, chipset 1060 outputs information to output 1065, such as a display, and may read and write information to storage device 1070, which may include magnetic media, and solid-state media, for example. Chipset 1060 may also read data from and write data to storage device 1075 (e.g., RAM). A bridge 1080 for interfacing with a variety of user interface components 1085 may be provided for interfacing with chipset 1060. Such user interface components 1085 may include a keyboard, a microphone, touch detection and processing circuitry, a pointing device, such as a mouse, and so on. In general, inputs to system 1050 may come from any of a variety of sources, machine generated and/or human generated.

Chipset 1060 may also interface with one or more communication interfaces 1090 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1055 analyzing data stored in storage device 1070 or storage device 1075. Further, the machine may receive inputs from a user through user interface components 1085 and execute appropriate functions, such as browsing functions by interpreting these inputs using processor 1055.

It may be appreciated that example systems 1000 and 1050 may have more than one processor 1010 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of identifying concentrated animal feeding operations from remote sensing data, comprising:

receiving, by a computing system, remote sensing data for a geographical area, the remote sensing data comprising remote sensing images of the geographical area;

converting, by the computing system, the remote sensing data into a format processable by downstream machine learning models;

detecting, by an object detection model of the downstream machine learning models, a concentrated animal feeding operation in the remote sensing images;

segmenting and classifying, by the computing system, components in or around the concentrated animal feeding operation using a semantic segmentation model of the downstream machine learning models;

updating, by the computing system, outputs of the downstream machine learning models, the outputs comprising objects detected by the object detection model and the components segmented and classified using the semantic segmentation model; and estimating, by the computing system, a potential amount of energy yielded from the geographical area based on the concentrated animal feeding operation and the components on or around the concentrated animal feeding operation, wherein the potential amount of energy is yielded by capturing methane at the concentrated animal feeding operation and converting it to renewable gas.

2. The method of claim 1, further comprising:

filtering, by the computing system, the remote sensing data to remove portions of the remote sensing data that are known to not have concentrated animal feeding operations.

3. The method of claim 2, wherein the portions of the remote sensing data that are known to not have concentrated animal feeding operations comprise one or more of military zones, urban areas above a predefined population threshold, known forest regions, or altitudes above a predefined altitude threshold.

4. The method of claim 1, wherein detecting, by the object detection model of the downstream machine learning models, the concentrated animal feeding operation in the remote sensing images comprises:

generating a first label and a first confidence score for a bounding box corresponding to the concentrated animal feeding operation.

5. The method of claim 1, wherein segmenting and classifying, by the semantic segmentation model of the downstream machine learning models, the components in the remote sensing images comprises:

generating a first label and a segmentation polygon corresponding to detected objects in the concentrated animal feeding operation.

6. The method of claim 5, wherein updating, by the computing system, the outputs of the downstream machine learning models comprises:

adjusting one or more of the first label or a first confidence score based on the classified components from the semantic segmentation model.

7. The method of claim 1, wherein updating, by the computing system, the outputs of the downstream machine learning models comprises:

modifying or removing first bounding boxes generated by the object detection model and/or or semantic segmentation polygons generated by the semantic segmentation model.

8. The method of claim 1, wherein estimating, by the computing system, the potential amount of energy yielded from the geographical area based on the concentrated animal feeding operations and the components of the concentrated animal feeding operation comprises:

estimating a number of animals present at the concentrated animal feeding operation.

9. A non-transitory computer readable medium comprising one or more programming instructions stored thereon, which, when executed by a processor, causes a computing system to perform operations comprising:

receiving, by the computing system, remote sensing data for a geographical area, the remote sensing data comprising remote sensing images of the geographical area;

converting, by the computing system, the remote sensing data into a format processable by downstream machine learning models;

detecting, by an object detection model of the downstream machine learning models, a concentrated animal feeding operation in the remote sensing images;

segmenting and classifying, by the computing system, components of the concentrated animal feeding operation using a semantic segmentation model of the downstream machine learning models;

updating, by the computing system, outputs of the downstream machine learning models, the outputs comprising objects detected by the object detection model and the components classified using the semantic segmentation model; and estimating, by the computing system, a potential amount of energy yielded from the geographical area based on the concentrated animal feeding operation and the components on or around the concentrated animal feeding operation, wherein the potential amount of energy is yielded by capturing methane at the concentrated animal feeding operation and converting it to renewable gas.

10. The non-transitory computer readable medium of claim 9, further comprising:

filtering, by the computing system, the remote sensing data to remove portions of the remote sensing data that are known to not have concentrated animal feeding operations.

11. The non-transitory computer readable medium of claim 10, wherein the portions of the remote sensing data that are known to not have concentrated animal feeding operations comprise one or more of military zones, urban areas above a predefined population threshold, known forest regions, or altitudes above a predefined altitude threshold.

12. The non-transitory computer readable medium of claim 9, wherein detecting, by the object detection model of the downstream machine learning models, the concentrated animal feeding operation in the remote sensing images comprises:

generating a first label and a first confidence score for a bounding box corresponding to the concentrated animal feeding operation.

13. The non-transitory computer readable medium of claim 9, wherein segmenting and classifying, by the semantic segmentation model of the downstream machine learning models, the concentrated animal feed operation components in the remote sensing images comprises:

generating a first label and a segmentation polygon corresponding to detected objects in the concentrated animal feeding operation.

14. The non-transitory computer readable medium of claim 13, wherein updating, by the computing system, the outputs of the downstream machine learning models comprises:

adjusting one or more of the first label or a first confidence score based on the classified components from the semantic segmentation model.

15. The non-transitory computer readable medium of claim 9, wherein updating, by the computing system, the outputs of the downstream machine learning models comprises:

modifying or removing first bounding boxes generated by the object detection model or semantic segmentation polygons generated by the semantic segmentation model.

16. A system comprising:

a processor; and a memory having programming code stored thereon, which, when executed by the processor, causes the system to perform operations comprising:

receiving remote sensing data for a geographical area, the remote sensing data comprising remote sensing images of the geographical area;

converting the remote sensing data into a format processable by downstream machine learning models;

detecting, by an object detection model of the downstream machine learning models, a concentrated animal feeding operation in the remote sensing images;

segmenting and classifying components of the concentrated animal feeding operation using a semantic segmentation model of the downstream machine learning models;

updating outputs of the downstream machine learning models, the outputs comprising objects detected by the object detection model and the components classified using the semantic segmentation model; and estimating a potential amount of energy yielded from the geographical area based on the concentrated animal feeding operation and the components on or around the concentrated animal feeding operation, wherein the potential amount of energy is yielded by capturing methane at the concentrated animal feeding operation and converting it to renewable gas.

17. The system of claim 16, further comprising:

filtering the remote sensing data to remove portions of the remote sensing data that are known to not have concentrated animal feeding operations.

18. The system of claim 16, wherein segmenting and classifying, by the semantic segmentation model of the downstream machine learning models, the concentrated animal feeding operation components in the remote sensing images comprises:

generating a first label and a segmentation polygon corresponding to detected objects in the concentrated animal feeding operation.

19. The system of claim 18, wherein updating the outputs of the downstream machine learning models comprises:

adjusting one or more of the first label or a first confidence score based on the classified components from the semantic segmentation model.

20. The system of claim 16, wherein updating the outputs of the downstream machine learning models comprises:

modifying or removing first bounding boxes generated by the object detection model or semantic segmentation polygons generated by the semantic segmentation model.

* * * * *